Dec. 13, 1938.          A. L. FREEDLANDER ET AL          2,140,201
OIL WELL BELT CONNECTER
Filed Sept. 28, 1936
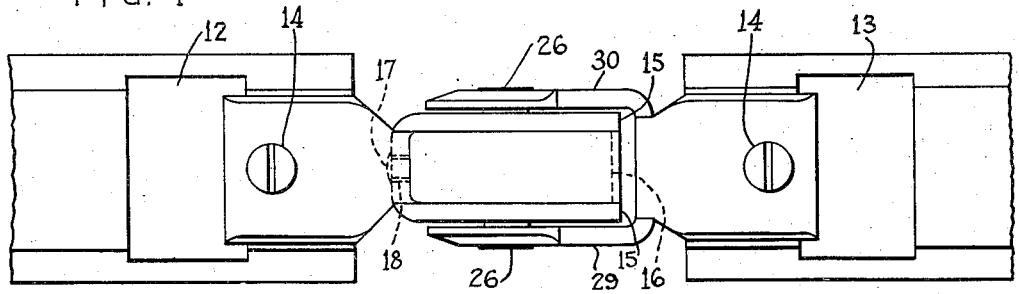
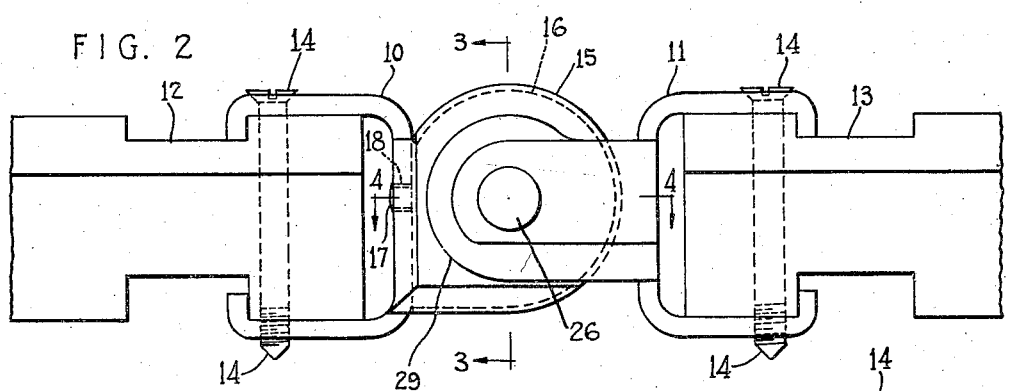
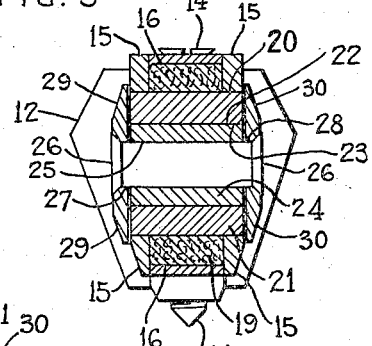
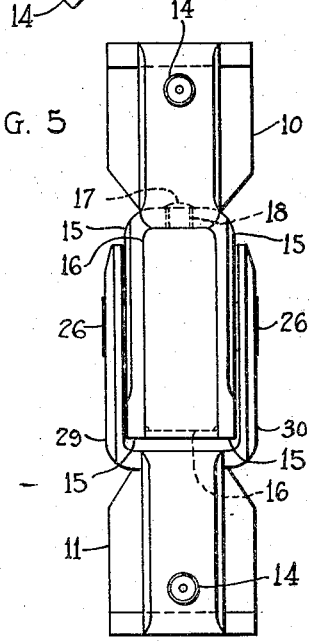
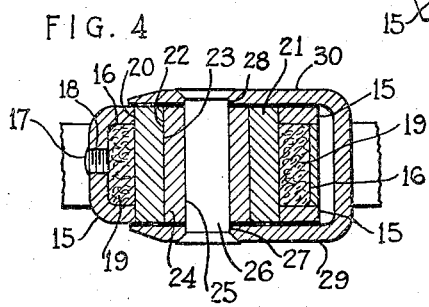
*INVENTORS*
ABRAHAM L. FREEDLANDER,
NORMAN J. RITZERT.
BY
*ATTORNEYS*

Patented Dec. 13, 1938

2,140,201

UNITED STATES PATENT OFFICE 2,140,201

OIL WELL BELT CONNECTER

Abraham L. Freedlander and Norman J. Ritzert, Dayton, Ohio, assignors to The Dayton Rubber Mfg. Company, Dayton, Ohio, a corporation of Ohio Application September 28, 1936, Serial No. 102,966

3 Claims. (Cl. 24—33)

This invention relates to belt connecters, and in particular, to belt connecters having means for lubricating the bearing surfaces thereof.

One object of this invention is to provide a belt connecter having pivot members engaging one another along bearing surfaces, provision being made for maintaining a supply of lubricant adjacent the bearing surfaces for constantly lubricating these surfaces.

Another object is to provide a belt connecter having a pair of interengaging clamps, wherein one clamp is provided with a lubricant reservoir adapted to supply lubricant to the bearing on which the opposite belt clamps engage one another.

Another object is to provide a belt connecter having a pair of belt clamps engaging one another along a pair of bearing members, one of these bearing members having associated therewith a lubricant container preferably having a wick or similar absorbent element for absorbing and supplying lubricant to the bearing members.

Another object is to provide a belt connecter of the type described above, wherein one of the bearing members is of a perforated or porous construction, permitting the lubricant from the lubricant reservoir to pass through the pores or perforations of the bearing and flow into the space between the opposing bearing members to provide lubrication for their engagement.

In the drawing:

Figure 1 is a top plan view of the belt connecter of this invention.

Figure 2 is a side elevation of the belt connecter shown in Figure 1.

Figure 3 is a vertical cross section taken along the line 3—3 of Figure 2.

Figure 4 is a horizontal section taken along the line 4—4 of Figure 2.

Figure 5 is a bottom plan view of the belt connecter shown in Figures 1 and 2.

In general, the belt connecter of this invention consists of a pair of interengaging belt clamps secured to the opposite ends of a belt, and having bearing members at their point of engagement with one another. Associated with one of these bearing members, which is preferably of porous or perforated construction, is a lubricant reservoir adapted to supply lubricant through the pores or perforations to the opposing bearing surfaces, and thereby to lubricate them during their engagement. The lubricant reservoir preferably consists of a space surrounding one of the bearing members, and optionally contains an absorbent element, such as a wick, for more easily absorbing and retaining the lubricant as well as preventing leakage thereof other than through the pores or perforations of the bearing to the interengaging surfaces.

Referring to the drawing in detail, Figures 1 and 2 show the belt connecter of this invention as consisting of belt clamps, generaly designated 10 and 11, secured to the opposite ends 12 and 13 of a belt by means of the clamp screws 14. The belt clamp 10 is provided with a forwardly projecting portion 15 having an internal annular chamber 16 (Figures 3 and 4), access to which is had by means of the threaded plug 17 mounted in the threaded aperture 18. The annular chamber 16 may serve directly as a lubricant reservoir, or it may be optionally provided with a wick or absorbent packing 19 adapted to absorb oil supplied thereto through the aperture 18, and feed this lubricant to the bearings as required.

The forwardly projecting portion 15 is provided with a transverse bore 20 (Figures 3 and 4), within which is mounted a bearing bushing 21. A tight connection is maintained between the bearing bushing 21 and the belt clamp portion 15 so that lubricant cannot escape therebetween. The bearing bushing 21 is preferably of a porous material, such as a porous bronze alloy, or else it may be provided with perforations so as to permit the lubricant to pass from the chamber 16, through the bearing bushing 21, to the inner surface 22 thereof and lubricate its engagement with the outer surface 23 of the tubular bearing member 24. The latter is preferably of a hardened steel construction, and has an inner bore 25 adapted to receive a rivet or similar connecting member 26. The rivet 26 passes through the holes 27 and 28 in the opposite arms 29 and 30 of the belt. The connecting member 26 is provided with enlarged heads so as to retain the entire assembly in a locked position.

In the assembly of the belt connecter of this invention the bearing bushing 21 is passed through the bore 20 in the belt clamp portion 15, the wick 19, if used, having been previously inserted within the chamber 16. In order to maintain an oil-tight connection the bearing bushing 21 may be pressed or otherwise tightly secured to the belt clamp portion 15. The bearing member 24 is then inserted within the bearing bushing 21 and the connecting member 26 passed through the bore 25 in the center of the bearing member 24. The ends of the connecting member 26 are then upset to provide enlarged heads at the outer ends of the holes 27 and 28 in the belt clamp arms 29 and 30. The chamber 16 is then filled with lubricant through the hole 18, and the plug 17 is then inserted to seal the lubricant within the chamber 16.

In operation, as the belt ends 12 and 13 move from a large pulley to a small one, they flex relatively to one another and cause the bearing bushing 21 to oscillate relatively to the tubular bearing member 24. A bearing engagement is thus caused to take place between the inner surface 22 of the bearing bushing 21 and the outer surface 23 of the bearing bushing 24. As this engagement takes place lubricant passes through the pores or perforations in the bearing bushing 21 and forms a lubricant film between the opposing surfaces 22 and 23. The arrangement of the lubricant chamber in the belt clamp itself thereby provides a constant supply of lubricant which is always available to lubricate the bearing surfaces 22 and 23. The use of a wick or absorbent element 19 is optional, and is preferred on account of its tendency to hold the lubricant over a longer period of time and to supply it in the small quantities needed from time to time.

It will be understood that we desire to comprehend within this invention such modifications as come within the scope of the claims and the invention.

Having thus fully described our invention, what we claim as new and desire to secure by Letters Patent, is:

1. In combination in a belt connecter, a pair of belt clamps, one of said clamps having inwardly directed arms provided with aligning holes to receive a tie member, the other of said clamps provided with inwardly directed arms located parallel with the first mentioned arms and having aligning holes of larger diameter than the holes in the said first mentioned arms, and spaced apart to provide an annular lubricant reservoir, a tie member in the holes of said first mentioned arms and interconnecting said arms, a tubular bearing element surrounding the tie member, and a bearing bushing of porous material with a multiplicity of minute passages therein surrounding said bearing element.

2. In combination in a belt connecter, a pair of belt clamps, one of said clamps having inwardly directed arms provided with aligning holes to receive a tie member, the other of said clamps provided with inwardly directed arms located parallel with and arranged within the first mentioned arms, constructed to provide an internal annular lubricant reservoir and having aligning openings of larger diameter than the holes in said first mentioned arms, a tie member in the holes of said first mentioned arms and interconnecting said arms, a tubular bearing element of relatively hard material surrounding the tie member, and a bearing bushing of porous material with a multiplicity of minute passages therein surrounding said bearing element and forming the inner annular wall of said lubricant reservoir.

3. In combination in a belt connecter, a pair of belt clamps, one of said clamps having inwardly directed arms provided with aligning holes to receive a tie member, a tie member located in said holes and interconnecting said arms, the other of said clamps provided with inwardly directed arms located parallel with and arranged within the first mentioned arms and spaced apart to form an annular internal lubricant reservoir, a lubricant-bearing wick in said reservoir, said arms being provided with enlarged aligned apertures, a relatively hard bearing element surrounding said tie member, and a bearing bushing of porous material with a multiplicity of minute passages therein surrounding said bearing element and filling the space between said bearing element and said last mentioned arms, said bushing forming the inner wall of the lubricant reservoir.

ABRAHAM L. FREEDLANDER.
NORMAN J. RITZERT.